United States Patent
Xing et al.

(10) Patent No.: US 8,228,809 B1
(45) Date of Patent: Jul. 24, 2012

(54) INTELLIGENT MODE SWITCHING IN COMMUNICATION NETWORKS

(75) Inventors: Guanbin Xing, Issaquah, WA (US); Manyuan Shen, Bellevue, WA (US); Xun Shao, Bellevue, WA (US)

(73) Assignee: Adaptix, Inc., Carrollton, TX (US)

( * ) Notice: Subject to any disclaimer, the term of this patent is extended or adjusted under 35 U.S.C. 154(b) by 283 days.

(21) Appl. No.: 11/963,265

(22) Filed: Dec. 21, 2007

(51) Int. Cl.
*G01R 31/08* (2006.01)
*H04W 4/00* (2009.01)
*H04J 3/16* (2006.01)

(52) U.S. Cl. .............. 370/252; 370/328; 370/465

(58) Field of Classification Search .............. None
See application file for complete search history.

(56) References Cited

U.S. PATENT DOCUMENTS

| | | | |
|---|---|---|---|
| 6,662,024 B2 | 12/2003 | Walton et al. | |
| 6,985,434 B2 | 1/2006 | Wu et al. | |
| 6,996,056 B2 * | 2/2006 | Chheda et al. | 370/209 |
| 7,058,367 B1 | 6/2006 | Luo et al. | |
| 7,126,996 B2 * | 10/2006 | Classon et al. | 375/260 |
| 7,224,977 B2 | 5/2007 | Cavalli et al. | |
| 7,352,718 B1 * | 4/2008 | Perahia et al. | 370/329 |
| 7,428,268 B2 | 9/2008 | Shen et al. | |
| 7,460,466 B2 * | 12/2008 | Lee et al. | 370/208 |
| 7,529,311 B2 | 5/2009 | Shen et al. | |
| 7,974,571 B2 | 7/2011 | Dankberg et al. | |
| 2002/0102950 A1 | 8/2002 | Gore et al. | |
| 2002/0181390 A1 | 12/2002 | Mody et al. | |
| 2002/0181509 A1 | 12/2002 | Mody et al. | |
| 2003/0104808 A1 | 6/2003 | Foschini et al. | |
| 2003/0125040 A1 | 7/2003 | Walton et al. | |
| 2003/0190897 A1 | 10/2003 | Lei et al. | |
| 2004/0001429 A1 | 1/2004 | Ma et al. | |
| 2004/0082311 A1 * | 4/2004 | Shiu et al. | 455/403 |
| 2004/0120274 A1 | 6/2004 | Petre et al. | |
| 2004/0127223 A1 | 7/2004 | Li et al. | |
| 2004/0162080 A1 | 8/2004 | Kostic et al. | |
| 2004/0192204 A1 | 9/2004 | Periyalwar et al. | |
| 2005/0141644 A1 | 6/2005 | Sadowsky | |
| 2006/0056530 A1 | 3/2006 | Nakao | |
| 2006/0083195 A1 * | 4/2006 | Forenza et al. | 370/328 |
| 2006/0120477 A1 | 6/2006 | Shen et al. | |

(Continued)

FOREIGN PATENT DOCUMENTS

EP    1 648 097 A2    4/2006

(Continued)

OTHER PUBLICATIONS

Agustin, A., et al., "Hybrid turbo FEC/ARQ system and distributed space-time cooperative transmission in the downlink," Personal, Indoor, and Mobile Radio Communications, 2004, PIMRC International Symposium, Sep. 8, 2004, vol. 1, pp. 380-384.

(Continued)

*Primary Examiner* — Nittaya Juntima
(74) *Attorney, Agent, or Firm* — Martin & Ferraro, LLP

(57) ABSTRACT

Systems and methods for intelligently switching between communication modes. An optimum communication mode is selected based upon determining the mobility of the subscriber station, the location of the subscriber station, and orthogonality of signals received from the subscriber station with respect to a signal of another subscriber station. Each determination may be continually or incrementally performed according to the passage of a time interval or upon observation of changes in relevant conditions.

50 Claims, 5 Drawing Sheets

U.S. PATENT DOCUMENTS

| | | | |
|---|---|---|---|
| 2007/0010196 | A1 | 1/2007 | Periyalwar et al. |
| 2007/0049218 | A1* | 3/2007 | Gorokhov et al. ............ 455/102 |
| 2008/0046949 | A1 | 2/2008 | Liu |
| 2008/0075033 | A1 | 3/2008 | Shattil |
| 2008/0159203 | A1* | 7/2008 | Choi et al. .................... 370/328 |
| 2008/0175189 | A1* | 7/2008 | Furrer et al. .................. 370/328 |
| 2009/0016290 | A1 | 1/2009 | Chion et al. |
| 2010/0119004 | A1* | 5/2010 | Hadad .......................... 375/267 |

FOREIGN PATENT DOCUMENTS

| | | |
|---|---|---|
| JP | 7-245776 A | 9/1995 |
| JP | 9-037337 A | 2/1997 |
| JP | 10-308972 A | 11/1998 |
| JP | 2001-036463 A | 2/2001 |
| JP | 2001-339342 A | 12/2001 |
| JP | 2004-040232 A | 2/2004 |
| JP | 2004-064108 A | 2/2004 |
| WO | WO 02/31766 A2 | 4/2002 |
| WO | WO 02/31991 A2 | 5/2002 |
| WO | WO 03/081938 A1 | 10/2003 |
| WO | WO 2006/016485 A1 | 2/2006 |

OTHER PUBLICATIONS

Dohler, Mischa, et al,, "Performance of Distributed Space-Time Block Codes", Vehicular Technology Conference, May 17, 2004, USA; 746. pp. 742-746.

Inoue, Manabu, et al., "Space Time Transmit Diversity for AFDM Multi Base Station System", Mobile and Telecommunications Network, 2002; 4th International Workshop, Sep. 9-11, 2002; pp. 30-34.

Love, David et al., "Grassmannian Bearnforming for Multiple-Input Multiple-Output Wireless Systems", IEEE Transactions of Information Theory, vol. 49, No. 10, Oct. 2003, pp. 2735-2747.

Max Costa, "Writing on Dirty Paper," IEEE Transaction on Information Theory, vol. IT-29, No. 3, May 1983.

Miyano, T., et al., "Space time coded cooperative relaying technique for rnultihop communications", IEEE 60th Vehicular Technology Conference, VTC2004-Fall, 2004, IEE Piscataway, New Jersey, pp. 5140-5144.

Naguib, Ayman et al., "A Space-Time Coding Modern for High-Data-Rate Wireless Communications", IEEE Journal on Selected areas in Communications, vol. 16, No. 8, Oct. 1998, pp. 1459-1478.

Naguib, Ayman et al., "Space-Time Coding and Signal Processing for High Data Rate Wireless Communications", ATT&T Labs-Research, Dated Jan. 18, 2001, 53 pages (with Internet abstract attached).

Oechtering, Tobia J., On the Capacity of a Distributed Multiantenna System using Cooperative Transmitters, Vehicular Technology Conference, 2003, VTC 2003-Spring, Apr. 25, 2003, vol. 1, pp. 75-79.

Poo, Lei, "Space-Time Coding for Wireless Communication: A Survey", Stanford University, dated Fall 2002, pp. 1-17.

Tang, Yipeng, et al., "Coded Transmit Macrodiversity; Block Space-Time Codes over Distributed Antennas", Connecting the Mobile World: Proceedings/IEEE VTS 53rd Vehicular Technology Conference, IEEE Service Center, May 6, 2001, pp. 1435-1438.

Umehira, M., et al., "100Mbit/s SDM-COFDM over MIMO Channel for Broadband Mobile Communications", Technical Report of the Institute of Elecrtronics, Information and Communication Engineers, Japan, Oct. 12, 2001. vol. 101, No. 370, pp. 37-42.

V. Tarokh et al., "Space-Time Codes for High Data Rate Wireless Communication: Performance Criterion and Code Construction", IEEE Trans. Inform Theory, vol. 44, No. 2, Mar. 1998, pp. 744-765.

V. Tarokh et al., "Space-Time Block Codes from Orthogonal Designs", IEEE Trans. Inform. Theory, vol. 45. No. 5, Jul. 1999, pp. 1456-1467.

W Yu, D.P. Varodayan and J.M. Cioffi, "Trellis and convolutional precoding for transmitter-based interference presubstraction," IEEE Trans. on Communications, vol. 53, No. 7, pp, 1220-1230, Jul. 2005.

\* cited by examiner

INTELLIGENT MODE SWITCHING IN COMMUNICATION NETWORKS

TECHNICAL FIELD

The present invention generally relates to communication networks. In particular, the present invention relates to systems and methods for providing intelligent communication mode switching in the uplink and/or downlink for communication across a network.

BACKGROUND OF THE INVENTION

In communication networks, different schemes have been used to improve communication between a base station (BS) and subscriber station (SS) across the network. For example, some networks employ a single transmit antenna and single receive antenna at the BS and subscriber station SS. These systems may improve communication, i.e., increase SINR, by employing adaptive coding/modulation schemes, where the signal modulation scheme is adjusted to effectuate an increase in SINR. Other networks employ different antenna array modes, i.e., modes of communication, between a BS and a SS where each of the BS and SS have multiple antennas. Examples of these multiple antenna array communication modes include Space-Time Block Code (STBC), Multiple-Input Multiple-Output (MIMO), Space Division Multiple Access (SDMA), and beam forming (BF) techniques. Each of these multiple antenna array communication modes is advantageously used under certain conditions, but are of only limited usefulness under other conditions. For example, SDMA schemes provide good coverage and efficient use of available spectrum, but are limited to effective use only with non-moving or slow-moving SSs. An STBC scheme is best used for fast-moving, dynamic SSs, but provides less efficient use of available spectrum. On the other hand, a Beam Forming (BF) scheme is most effective for communications involving subscribers at or near cell boundaries as it can be used to increase signal strength and reduce interference from other cells.

More often than not, simply employing a single mode of communication for communication is not practical because any given mode is not versatile enough to be useful across a sufficiently wide range of conditions. As such, schemes have been employed where the network switches from one mode of communication to another to accommodate the changing conditions. Nevertheless, these schemes are somewhat limited in that they only provide switching between, at best, two modes. Also, such systems are limited because they typically consider only SS position when deciding to switch between communication modes. While some of these systems are touted as being operable to switch between multiple antenna modes; at best, these systems switch between only two modes and are limited to point-to-point communication. Further, these systems do not optimize communication mode selection point-to-multiple-point in a multi-cell context.

By way of example, suppose a user is operating in a LAN type environment. In all likelihood, the user will have only one available communication scheme, e.g., MIMO, across the network. Another communication mode, e.g., BF will not be available to that user because it has not been implemented in such an environment. Of course, BF has been implemented in such networks, typically in a proprietary form in the CDMA context, and the like. However, in no case has MIMO, for example, been additionally implemented in the same network. Accordingly, a user of the network has been forced to settle for one mode of communication or another.

SUMMARY OF THE INVENTION

In view of the above, there is a need for an intelligent method of switching between various modes of communication in a communication network. Such an intelligent system should be able to be employed in a wide-range of networks including, for example LAN and WiMAX. Further, such an intelligent method would be based upon, for example, the number of antennas associated with a SS and communication channel conditions. The ultimate goal of such an intelligent method is to insure link reliability and maximize overall system capacity while having an intelligent algorithm that facilitates on-the-go switching between modes of communication on a per user basis.

A preferred embodiment of the present invention provides systems and methods for selecting modes of communication over a network. According to such systems and methods, an algorithm involves determining the mobility of said subscriber station, determining the position of said subscriber station, and determining orthogonality of the signal of said subscriber station with respect to another subscriber. Based upon these determinations, a communication mode maybe selected to optimize link reliability and/or optimize network performance.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE PREFERRED EMBODIMENT

Figure 1:
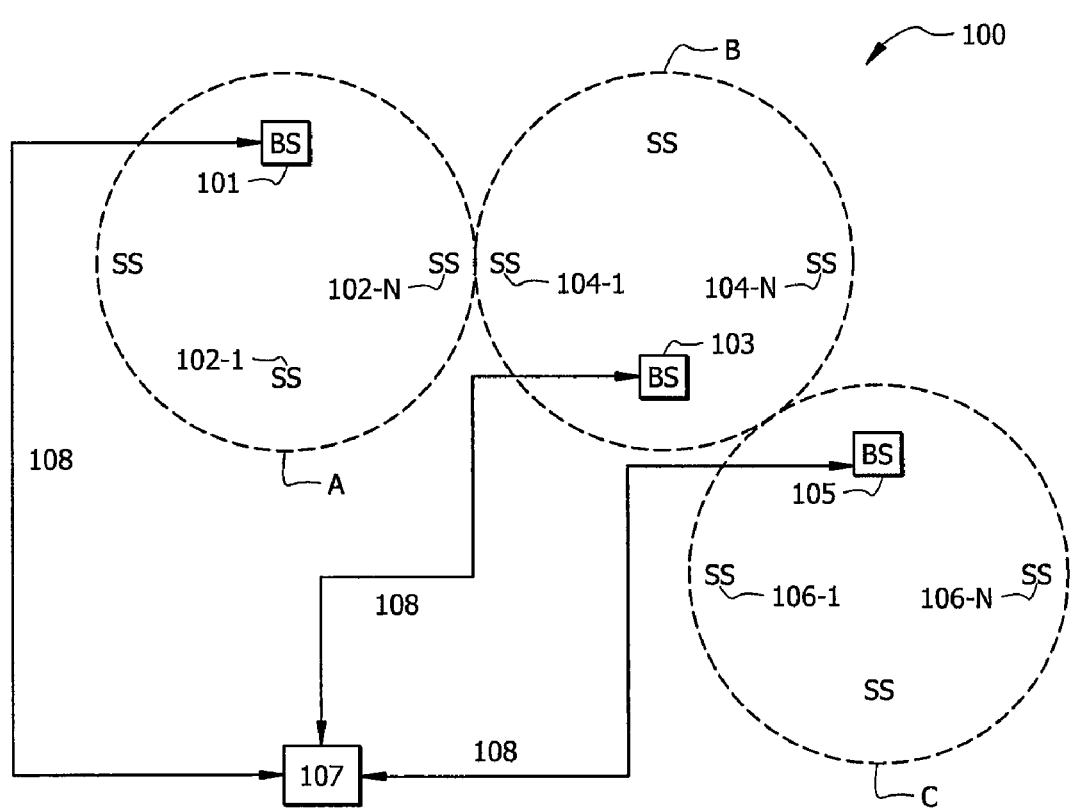
FIG. 1 is a system according to a preferred embodiment of the present invention.

Referring to FIG. 1, communication system 100 is adapted to provide intelligent communication mode switching in the uplink (communications from the SS to the BS) and the downlink (communications from the BS to SS). System 100 can be generalized to most communication networks and includes network components as known in the art adapted to provide operation as described herein. BS 101 communicates with SS 102-1 through 102-N and vice versa in cell A, BS 103 communicates with SSs 104-1 though 104-N and vice versa in cell B, and BS 105 communicates with SSs 106-1 through 106-N and vice versa in cell C. Each of BS 101, 103, and 105 communicate on "backhaul" network 107 via communication means 108. Communication means 108 may comprise phone lines, RF communication components, and the like as known in the art.

As will be described in greater detail below, system 100 implements an intelligent methodology whereby an iterative process is executed to select, from a number of possibilities, which mode of communication to use between a BS and SS. System 100 and its related methodology applies a detailed mode switching algorithm not known in the art. According to preferred embodiments, the algorithm is used to select an optimum mode of communication based upon a sequence of determinations, including 1) SS mobility (i.e., a static or dynamic MS); 2) SS distance (i.e., relative distance between the SS and the BS and cell); and 3) SS orthogonality (i.e., whether the SS part of an orthogonal pair of SSs). Preferably, the algorithm executes these determination in the order provided above to make for an efficient and exceptionally robust scheme of communication mode switching. Advantageously, the methodology can be employed while the BS is communicating with a SS. Accordingly, the communication mode can be changed from one to another to ensure that the communication is optimized as conditions change during the call. It naturally follows that the methodology can be changed employed during handoff operations.

The present invention also relates to apparatus, e.g., BSs and SSs, for performing the operations herein. A BS or SS may be specially constructed for the required purposes, or it may comprise a general-purpose processor, selectively activated or configured by a program stored in the processor. Such a r program may be stored in a computer readable storage medium, such as, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals, e.g., carrier waves, infrared signals, digital signals, etc.

System 100 can be implemented in a number of communication networks such as, for example, a WiMAX communication network, i.e., a system based on the IEEE 802.16 standard. By way of such an example, suppose system 100 is implemented in a WiMAX communication network. Accordingly, system 100 would be capable of supporting modes of communication to a user as set forth in the WiMAX standard. That is, in the uplink a SS user could employ, for example, Maximum Ratio Combining (MRC), SDMA, MIMO, or circular delay diversity (CDD). In the downlink, there would be even more available modes of communication. Available communication mode choices include STBC, MIMO, SDMA, beam forming, and the like.

Figure 2:
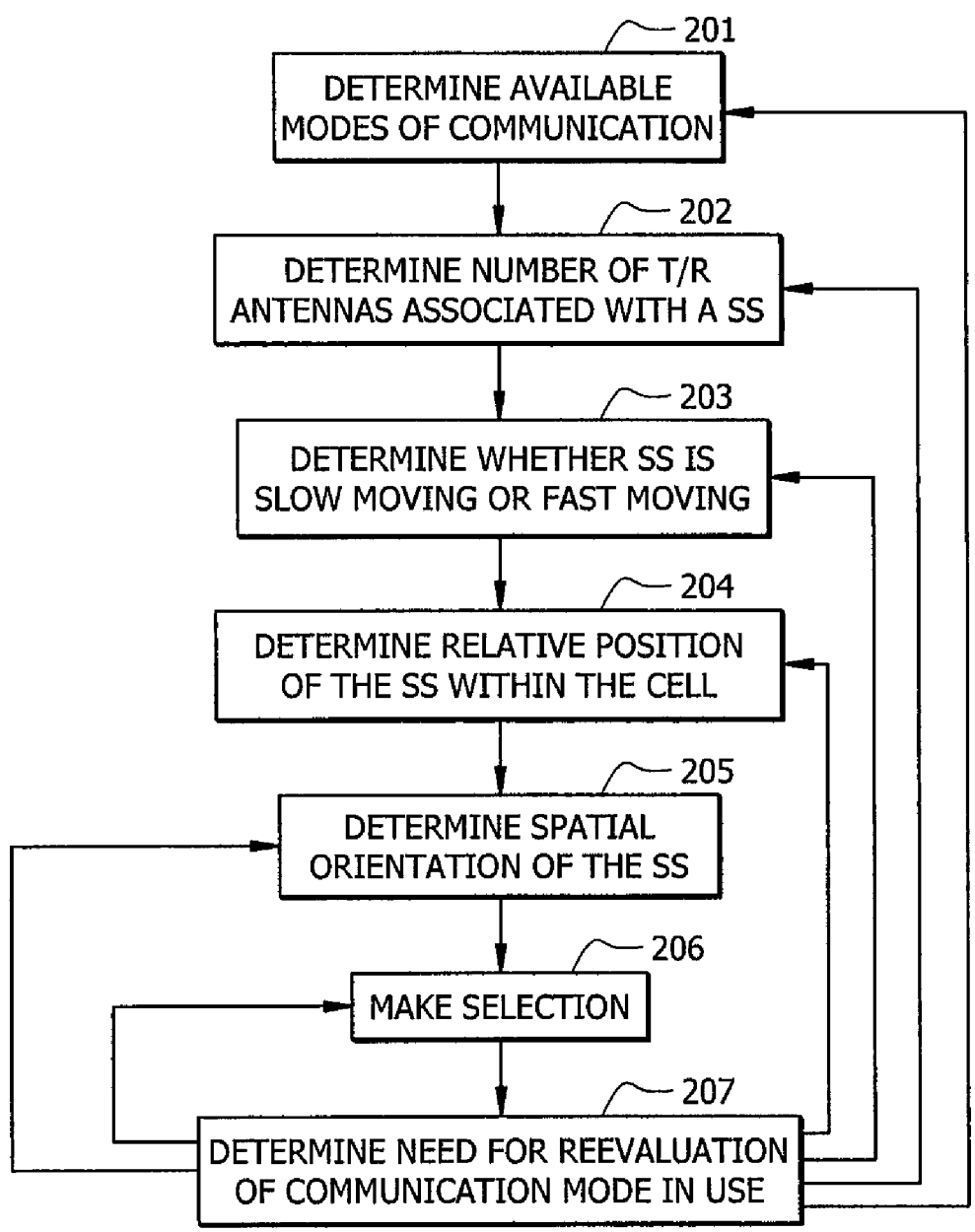
FIG. 2 is a flow diagram for determining a communication mode in the uplink according to a preferred embodiment of the present invention.

Referring to FIG. 2, a general overview of a preferred intelligent methodology of selectively choosing a mode of uplink communication according to system 100 is shown as method 200. Specific implementations will be described thereafter. Method 200 employs the intelligent algorithm described above to select the optimum mode of communication between a BS and SS. Accordingly, as will be further described, method 200 generally involves determining SS mobility, SS distance, and SS signal orthogonality with respect to at least one other SS. In this context, SSs are considered to be orthogonal to one another where their signals are such that cross-talk (e.g., co-channel interference, and is related to adjacent-channel interference) between their signals are significantly reduced or eliminated.

According to FIG. 2, at 201, a BS, such as for example BS 101 shown in FIG. 1, determines what modes are available for communication with a number of SSs, such as for example SS 102-1 through 102-N as shown in FIG. 1. BS 101 makes this determination based, in part, on information received from SSs within its cell, relating to the capabilities of those SSs. Also, BS 101 makes this determination in view of the specific communication standard or protocol that has been specified. For example, the WLAN standard does not allow SDMA or BF modes, whereas WiMAX specified these modes and others. It should be appreciated that, according to particular embodiments, each of SS 102-1 through 102-N may solely or partially determine which modes of communication are selected. In such embodiments, each SS 102 may be equipped with software and/or hardware capable of utilizing information necessary to select which modes of communication are used, or relay pertinent information to a BS, where the BS utilizes the information received from each SS to make the selection itself. As will be described in further, these concepts apply equally to uplink and downlink communications.

At 202, BS 101 determines the number of antennas for use in the transmission and/or reception associated with the SS. Such information may be provided to BS 101 by each SS 102. Based on that determination, BS 101 eliminates one or more otherwise available modes of communication for communication with that SS. Specifically, BS 101 eliminates from selection those modes for a particular link direction (e.g., uplink and/or downlink) best suited for SSs having multiple antennas where a SS has been determined to have a singe antenna available for use with respect to that link direction, and vice versa.

At 203, BS 101 determines if the SS is non-moving or slow-moving, or fast-moving. According to a preferred embodiment, what constitutes fast-moving will depend on system settings and can be thought of in terms of a threshold set at BS 101. Based on that determination, BS 101 may eliminate one or more otherwise available modes of communication from selection.

At 204, BS 101 determines the relative position of the SS within the cell. That is, BS 101 determines whether the SS is closer to the cell boundary or closer to BS 101. Based on that determination, BS 101 may eliminate one or more otherwise available modes of communication from selection.

At 205, BS 101 determines orthogonality of the SS signal with respect to at lease on other SS signal. According to particular embodiments, such a determination may involve determining if the SS is part of an orthogonal pair of SSs. Based on that determination, BS 101 may eliminate one or more otherwise available modes of communication from selection. Taken together, the determinations described above narrow down the filed of modes available for selection.

At 206, once the intelligent methodology described above is executed, there may be no more than one of the originally available modes left for selection. However, in the event more than one of the original modes of communication remains for selection, BS 101 may select a single mode based on a number of criteria such as, for example link reliability or implementation complexity. Also, each mode may be prioritized according to one or more metrics, such that BS 101 selects from the group of available modes according to the priority of the available modes.

At 207, BS 101 reevaluates the mode of communication being used to determine if that mode is still the optimal mode. This reevaluation may be prompted by the passage of a predetermined time interval as previously determined by BS 101, or may be prompted by observation of one or more changes in relevant conditions. The reevaluation process may prompt method 200 to begin at one of the steps described above, such that the entire method 200 need not necessarily be repeated.

Figure 3:
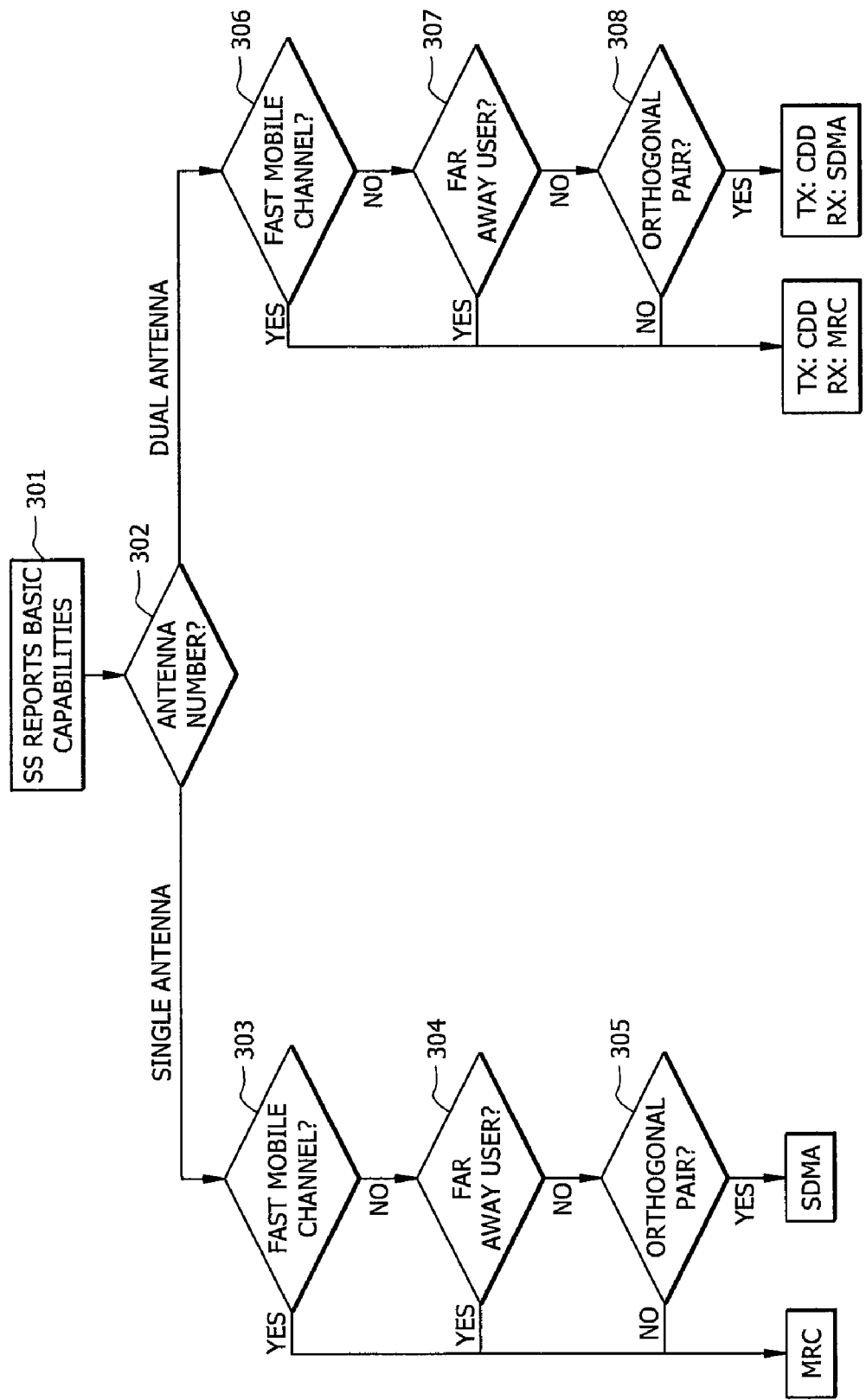
FIG. 3 is a flow diagram for determining a communication mode in the uplink according to another embodiment of the present invention.

Referring to FIG. 3, a specific implementation of method 200 is shown. In FIG. 3, generalized method 200 is implemented more specifically as method 300 in a communication network operating according to the WiMAX standard. The present inventors have found that, in a WiMAX network, uplink SDMA communication is generally desirable only for static or slow-moving SSs that are relatively close to the BS, and provide high spectrum efficiency (e.g., greater than four bits/sec./Hz.). Accordingly, highly mobile users are first eliminated from uplink SDMA communication. The determination of a fast-moving SS is based upon, for example, channel variance measurements performed at the BS over time. Also, based on RSSI/CINR measurements performed at the BS, the position of the SS within the cell is determined, i.e., SS location with respect to the BS and cell boundary. If the SS is determined to be relatively close to the cell boundary, that SS is eliminated from SDMA uplink communication. Further, orthogonally among SSs is critical to achieving expected gain. Therefore, only orthogonal SSs are assigned as SDMA pairs for uplink communication. The orthogonality of a pair SSs may be determined using uplink sounding techniques.

In furtherance of the above, at 301, a BS determines what modes are available for communication with a number of SSs. The BS makes this determination based, in part, on information relating to the capability of the SS with which it is communicating. For instance, each SS may inform the BS of its capabilities via SBC messages that include information relating to the number of transmit/receive antennas and/or modes of communication supported by each SS. At 302, the BS determines the number of transmit and/or receive antennas associated with the MS; this determination may be based upon, for example, SBC messages received from the SS. If the SS has one transmit antenna, the BS proceeds along the single antenna decision-making process. At 303, the BS determines if the SS is a fast-moving base station. As mentioned, this determination may be based upon channel variance measurements over time. If the BS determines the SS is fast-moving, the BS selects the MRC mode of communication for uplink communication with that SS. If not, the BS proceeds with the decision-making process. At 304, the BS determines the relative position of the SS within the cell. As mentioned, this determination may be based upon RSSI/CINR measurements performed at the BS. If the BS determines the SS is closer to the cell boundary than the BS, the BS selects the MRC mode of communication for uplink communication with that SS. If not, the BS proceeds with the decision-making process. At 305, the BS determines if the SS is part of an orthogonal pair of SSs. If not, the BS selects the MRC mode of communication for communication with that SS on the uplink. If the SS is part of an orthogonal pair, the BS selects SDMA communication mode for communication on the uplink. As mentioned, orthogonality may be determined by uplink sounding techniques.

If, at 302, the BS determines the SS has more than one transmit/receive antenna, the BS proceeds along the multiple antenna decision-making process of FIG. 3. In the event the SS has more than one antenna, it is possible to overlay a Circular Delay Diversity (CDD) scheme on top of the MRC scheme at the transmitter side. At 306, the BS determines if the SS is a fast-moving base station. As mentioned, this determination may be based upon channel variance measurements over time. If the BS determines the SS is fast-moving, the BS selects TX: CDD and RX: MRC mode of communication for uplink communication with that SS. If not, the BS proceeds with the decision-making process. At 307, the BS determines the relative position of the SS within the cell. As mentioned, this determination may be based upon RSSI/CINR measurements performed at the BS. If the BS determines the SS is closer to the cell boundary than the BS, the BS selects TX: CDD and RX: MRC mode of communication for uplink communication with that SS. If not, the BS proceeds with the decision-making process. At 308, the BS determines if the SS is part of an orthogonal pair of SSs. If not, the BS selects TX: CDD and RX: MRC mode of communication for communication with that SS on the uplink. If the SS is part of an orthogonal pair, the BS selects TX: CDD and RX: SDMA communication mode for communication on the uplink. As mentioned, orthogonality may be determined by uplink sounding techniques.

Figure 4:
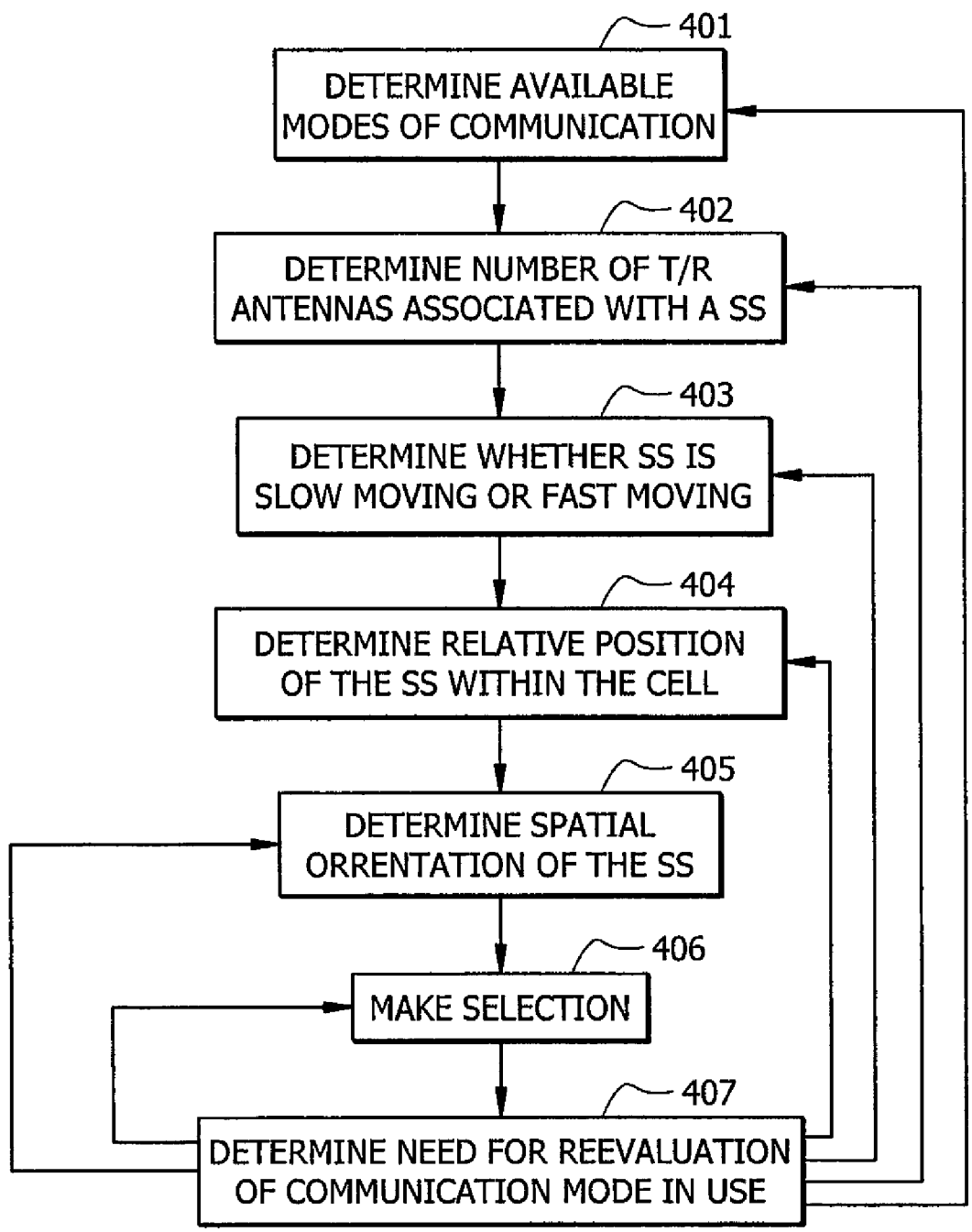
FIG. 4 is a flow diagram for determining a communication mode in the downlink according to a preferred embodiment of the present invention.

Referring to FIG. 4, a preferred intelligent methodology of selectively choosing a mode of downlink communication according to system 100 is shown as method 400. Similar to the methods described above, method 400 employs the intelligent algorithm described above to select the optimum mode of communication between a BS and SS. Accordingly, as will be further described, method 200 generally involves determining SS mobility, SS distance, and SS orthogonality. At 401, a BS, such as for example BS 101 shown in FIG. 1, determines what modes are available for communication with a number of SSs, such as for example SS 102-1 through 102-N as shown in FIG. 1. BS 101 makes this determination based, in part, on information received from S Ss within its cell, relating to the capabilities of those SSs.

At 402, BS 101 determines the number of transmit and/or receive antennas associated with the SS. Based on that determination, BS 101 eliminates one or more otherwise available modes of communication for communication with that SS. Specifically, BS 101 eliminates from selection those modes best suited for SSs having multiple antennas where a SS has been determined to have a singe antenna, and vice versa.

At 403, BS 101 determines if the SS is non-moving or slow-moving, or fast-moving. According to a preferred embodiment, what constitutes fast-moving will depend on system settings and can be thought of in terms of a threshold set at BS 101. Based on that determination, BS 101 may eliminate one or more otherwise available modes of communication from selection.

At 404, BS 101 determines the relative position of the SS within the cell. That is, BS 101 determines whether the SS is closer to the cell boundary or closer to BS 101. Based on that determination, BS 101 may eliminate one or more otherwise available modes of communication from selection.

At 405, BS 101 determines orthogonality of the SS signal with respect to at least one other SS signal. According to particular embodiments, such a determination may involve determining if the SS is part of an orthogonal pair of SSs. Based on that determination, BS 101 may eliminate one or more otherwise available modes of communication from selection.

At 406, once the intelligent methodology described above is executed, there may be no more than one of the originally available modes left for selection. However, in the event more than one of the original modes of communication remains for selection, BS 101 may select a single mode based on a number of criteria such as, for example, link reliability or implementation complexity. Also, each mode may be prioritized according to one or more metrics, such that BS 101 selects from the group of available modes according to the priority of the available modes.

At 407, BS 101 reevaluates the mode of communication being used to determine if that mode is still the optimal mode. This reevaluation may be prompted by the passage of a predetermined time interval as previously determined by BS 101, or may be prompted by observation of one or more changes in relevant conditions. The reevaluation process may prompt method 200 to begin at one of the steps described above, such that the entire method 200 need not necessarily be repeated.

Figure 5:
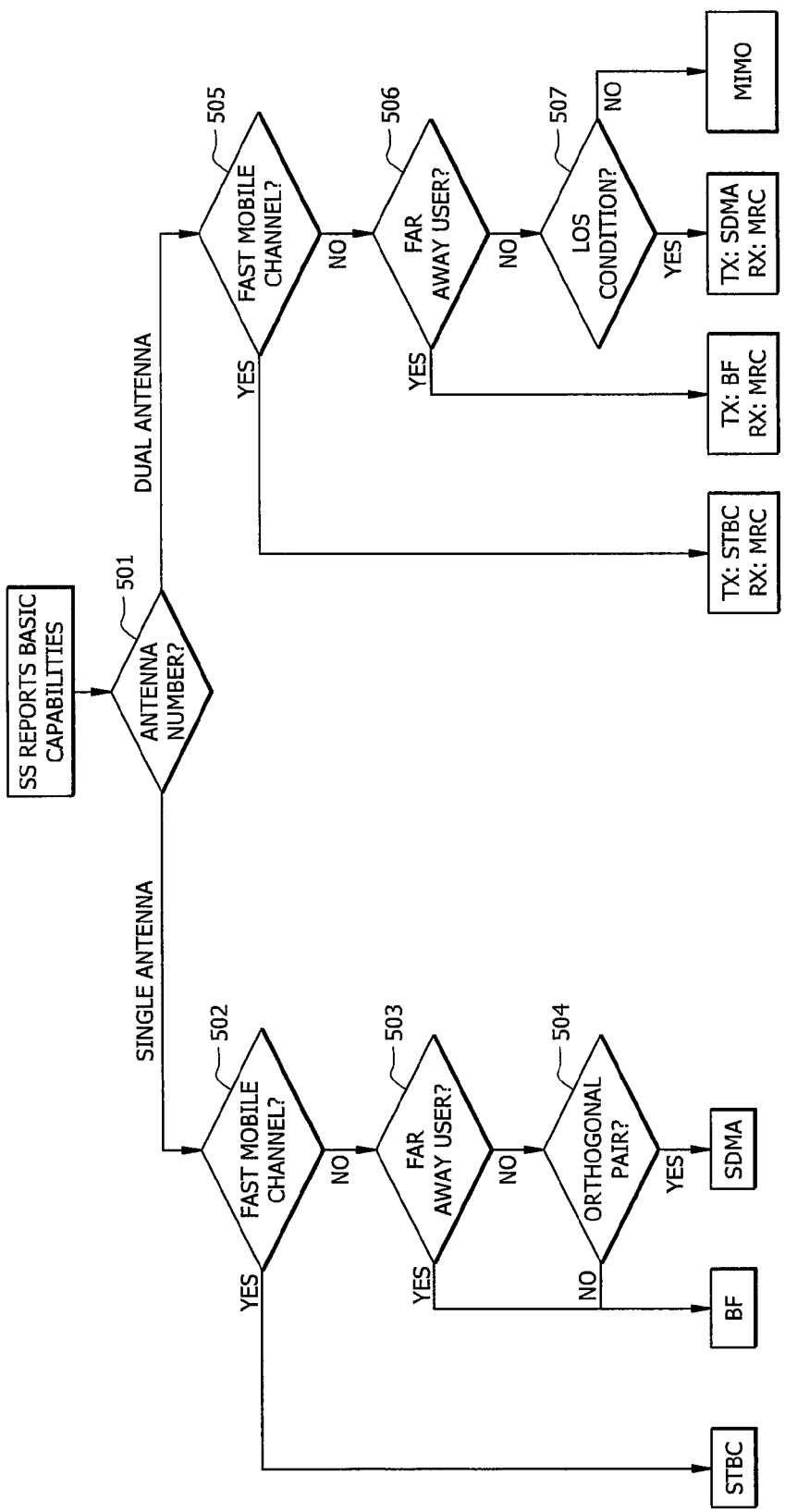
FIG. 5 is a flow diagram for determining a communication mode in the downlink according to another embodiment of the present invention.

Referring to FIG. 5, a specific implementation of method 400 is shown. In FIG. 5, generalized method 400 is implemented more specifically as method 500 in a communication network operating according to the WiMAX standard. According to this example, there will likely be four available modes of communication: MIMO, STBC, SDMA, MRC, and BF. At 501, a determination is made as to the number of antennas associated with the SS. Of course, if it is determined that the SS is equipped with only a single antenna, MIMO will not be an available communication mode.

Proceeding along the "single antenna" decision making process, at 502, it is determined if the SS is not-moving or slow-moving, or fast-moving. SS velocity is preferably determined sooner rather than later in the process because neither of BF, SDMA, or 2×MIMO are well-suited for fast-moving SSs. Therefore, determination of a fast-moving SS can typically eliminate several otherwise available modes of communication relatively quickly. If the SS is determined to be fast-moving, STBC is selected as the downlink communication mode. STBC is chosen for a fast-moving SS because it provides more reliability; that is, STBC offers the fastest link performance. If the SS is determined to be non-moving or slow-moving, the decision-making process continues. At 503, it is determined whether the SS is closer to the cell boundary or closer to the BS. Those SSs typically are associated with a poor receiving signal or strong neighboring cell interference. As such, if a SS is determined to be close to a cell boundary, BF is selected as the downlink communication mode. In this case, BF is chosen to increase signal strength while reducing interference from other cells. Also, the present inventors have recognized that it is less efficient to accommodate several users at the cell boundary using the same resource, as doing so increases interference. If the SS is determined to be closer to the BS than the cell boundary, the decision-making process continues. At 504, it is determined whether the SS is part of an orthogonal pair of SSs. If not, BF is chosen as the downlink mode of communication. If the SS is part of an orthogonal pair, SDMA is chosen as the downlink mode of communication.

If, at 501, it is determined that there are multiple antennas associated with the MS, the decision making process proceeds along the multiple antenna, e.g., "dual antenna," decision path. At 505, it is determined if the SS is not-moving or slow-moving, or fast-moving. As mentioned above, SS velocity is preferably determined sooner rather than later in the process because neither of BF, SDMA, or 2×MIMO are well-suited for fast-moving SSs. Therefore, determination of a fast-moving SS can typically eliminate several otherwise available modes of communication relatively quickly. If the SS is determined to be fast-moving, TX: STBC RX: MRC is selected as the downlink communication mode. STBC is chosen for a fast-moving SS because it provides more reliability; that is, STBC offers the fastest link performance. If the SS is determined to be non-moving or slow-moving, the decision-making process continues. At 506, it is determined whether the SS is closer to the cell boundary or closer to the BS. As mentioned above, SSs near a cell boundary are typically associated with a poor receiving signal or strong neighboring cell interference. As such, if a SS is determined to be close to a cell boundary, TX: BF, RX: MRC is selected as the downlink communication mode. In this case, BF is chosen to increase signal strength while reducing interference from other cells. Also, the present inventors have recognized that it is less efficient to accommodate several users at the cell boundary using the same resource, as doing so increases interference. If the SS is determined to be close to the BS, the decision-making process continues. At 507, it is determined whether there is a line-of-sight (LOS) condition. Specifically, a (LOS) condition is detected by sampling input data for a predetermined time period, comparing a magnitude of the sampled input data to a threshold signal strength level, and asserting a LOS indication if the number of samples that have signal strength less than the threshold signal strength level is less than a predetermined value. If a LOS condition is not detected, MIMO is selected as the downlink communication mode. MIMO is selected because it is advantageously used in a multi-path rich environment where local scatter signals are present. LOS may be determined by determining the condition number of the associated channel matrix. For example, assuming the case of M Tx antenna and N Rx antenna, this will be an M×N matrix. If a LOS condition is detected, the channel matrix will be ill-conditioned, meaning the matrix condition will be above the predetermined value described above. If a LOS condition is detected, TX: SDMA RX: MRC is selected as the downlink communication mode.

Referring again to FIG. 1, other embodiments of the present invention can be examined. While embodiments described above focused on communication in the context of a single BS and multiple SSs; it should be appreciated that the concepts described herein readily extend to communication in the context of multiple BSs and multiple SSs. The concepts of cooperative transmission modes are used to coordinate among multiples BSs associated with adjacent cells and to utilize such coordination in selecting a communication mode. In a multi-cell environment, BS 101 and BS 103 establish communication parameters between one another to resolve, for example, which SSs each BS will communicate with, whether the SSs are operating in single or multiple antenna mode, interference conditions, transmission schedules, and the like. For instance, if the SS is determined to operate as a multiple antenna SS, cooperative transmission MIMO can be employed where the transmitting antennas associated with different BSs work together as a "virtual" BS. These concepts are fully explained in U.S. Pat. No. 7,428,268, issued on Sep. 23, 2008 and entitled "Cooperative MIMO In Multicell Wireless Networks", the disclosure of which is herein incorporated by reference in its entirety. By way of example, suppose BS 101 transmits a downlink communication, e.g., A0, to SS 102-N, which is located along the cell boundary of BS 101. BS 101 also transmits a signal, e.g., A1, to BS 103. In response, BS 103 transmits the communication received from BS 101, that is A1, to SS 102-N. BS 103 and BS 101 can communicate with one another via the backhaul as known in the art, e.g., through the combination of 107 and 108. At SS 102-N, signal A0 is received from BS 101 and signal A1 is received from BS 103. SS 102-N advantageously leverages the signals received from both BSs to decode the full sequence, A0A1. This scheme, similar to a 2×2 MIMO scheme, is used to select from available communication modes and benefits from the resources and measurements provided from each of BS 101 and 103. As seen from the above, determinations relating to the number of antennas associated with a SS, in combination with cooperative transmission concepts, can be combined to provide an communication mode selection scheme.

By way of further example, consider the cooperative transmission mode scheme described above. Further consider that SS 102-N is subject to interference by, for example, communications between BS 103 and SS 104-1. Similar to the discussion above, BS 101 and BS 103 establish communication parameters between one another to resolve, for example, which SSs each BS will communicate with, whether the SSs are operating in single or multiple antenna mode, interference conditions, transmission schedules, and the like. It follows that BS 101 and BS 103 will determine that SS 102-N is located at or near the cell boundary, and therefore, subject to relatively strong interference from BS 103. If so, BS 103 pre-determines the signals that are transmitted between BS 103 and SS 104-1. Accordingly, BS 103 then notifies BS 101 as to the signals communicated between BS 103 and SS 104-1. As described above, such communication between BS 103 and BS 101 can be accomplished through a network backbone, as known in the art. In response, BS 101 "pre-cancels" the interfering signal (i.e., the signal between BS 103 and SS 104-N) from its downlink communication signal to SS 102-N. This technique is sometimes referred to as "dirty paper coding" by those skilled in the art. These concepts are fully explained in U.S. patent application Ser. No. 11/492,709, the disclosure of which is herein incorporated by reference in its entirety and attached hereto as Appendix A. In view of the above, algorithms involving coordination among adjacent BSs, determination of the number of antennas associated with a SS, determination of SS position within a cell provide for a communication mode selection scheme in the cooperative transmission context. As a result of the coordination between BS 101 and BS 103, SS 102-N, at the cell boundary of BS 101, receives downlink communication from BS 101 free from the interfering signal between BS 103 and SS 104-1.

As seen, utilizing cooperative transmission modes improves system performance at the cell boundary by either increasing throughput or reducing interference. Such embodiments are facilitated by communication among BSs and during system initiation where a BS will negotiate with other neighboring BSs for communication capabilities, and the like.

According to another embodiment of the present invention, the selection of a communication mode between BS and SS may be based upon consideration of the upper layer QoS. That is, the algorithms described herein are not limited to considering only physical layer conditions, e.g., SS mobility, RSSI/CINR, and SS orthogonality to make a decision. Rather, upper layer service requirements may be considered for a more refined decision-making process. For instance, consider a subscriber utilizing a narrowband, real-time service (e.g., a voice call) which usually does not allow for re-transmission/ARQ. In such case, a relatively reliable mode, perhaps STBC, is more desirable for the subscriber. One the other hand, consider the case where the subscriber instead is static and downloading a relatively large data file that requires high data transfer speed. In this case the user is more likely tolerate delay for retransmission, etc. Accordingly, a more aggressive or frequency-efficient scheme, perhaps MIMO or SDMA, will provide a better choice. Further, to enable this joint optimization, will ideally negotiate with SSs to exchange physical layer information and to will also include higher level QoS parameters.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of wireless communication, said method comprising:
   determining, by a base station, whether more than one antenna is associated with subscriber station;
   determining, by said base station, the mobility of said subscriber station;
   determining, by said base station, the position of said subscriber station;
   determining, by said base station, either spatial orthogonality of the signal of said subscriber station or whether a Line of Sight (LOS) condition is associated with said subscriber station;
   selecting, by said base station, a multiple antenna communication scheme based upon said determination of mobility, said determination of position, and said determination of said spatial orthogonality when more than one antenna is not associated with said subscriber station or said LOS condition when more than one antenna is associated with said subscriber station; and
   determining whether a Line of Sight (LOS) is associated with said subscriber station and selecting Multiple-Input Multiple-Output (MIMO) for a communication mode if said subscriber station is determined to be associated with more than one antenna, not fast-moving, closer to said base station, and not associated with said LOS condition.

2. The method of claim 1 wherein determining the mobility of said subscriber station comprises determining whether said subscriber station is static or dynamic.

3. The method of claim 2 further comprising selecting Maximum Ratio Combining (MRC) for a communication mode if said subscriber station is determined to be associated with one antenna and dynamic.

4. The method of claim 2 further comprising selecting Space-Time Block Code (STBC) for a communication mode if said subscriber station is determined to be associated with one antenna and dynamic.

5. The method of claim 1 wherein determining the position of said subscriber station comprises determining whether said subscriber station is closer to a cell boundary or closer to said base station.

6. The method of claim 5 further comprising selecting Maximum Ratio Combining (MRC) for a communication mode if said subscriber station is determined to be closer to said cell boundary.

7. The method of claim 5 further comprising selecting Beam Forming (BF) for a communication mode if said subscriber station is determined to be closer to said cell boundary.

8. The method of claim 1, wherein determining the orthogonality of the signal of said subscriber station comprises determining whether said subscriber station is a member of a pair of orthogonal subscriber stations.

9. The method of claim 8 further comprising selecting Maximum Ratio Combining (MRC) for a communication mode if said subscriber station is determined not to be a member of a pair of orthogonal subscriber stations.

10. The method of claim 8 further comprising selecting Space Division Multiple Access (SDMA) for a communication mode if said subscriber station is determined to be a member of a pair of orthogonal subscriber stations.

11. The method of claim 1 wherein determining whether more than one antenna is associated with said subscriber station comprises determining whether said subscriber station is operating as a multiple antenna subscriber station.

12. The method of claim 1 further comprising evaluating whether any of said determining the mobility of said subscriber station, said determining the position of said subscriber station, or said determining said orthogonality of the signal of said subscriber station should be repeated; and
changing said communication mode based, at least in part, upon changes measured by said repeated determinations.

13. The method of claim 1 wherein said selecting is further based upon Quality-of-Service (QoS) parameters.

14. A base station comprising:
one or more processors determining the mobility of a subscriber station, determining the position of said subscriber station, and determining either spatial orthogonality of the signal of said subscriber station with respect to at least another subscriber station signal or whether a line-of-sight (LOS) condition is associated with said subscriber station; and
antenna communication scheme based upon said determined mobility, said determined position, and one of said determination of said spatial orthogonality of the signal and said determination of said LOS condition.

15. The base station of claim 14 wherein at least one of said one or more processors determines whether said subscriber station is static or dynamic.

16. The base station of claim 15 further comprising logic to select Maximum Ratio Combining (MRC) for a communication mode if said subscriber station is determined to be dynamic.

17. The base station of claim 15 further comprising logic to select Space Time Block Code (STBC) for a communication mode if said subscriber station is determined to be dynamic.

18. The base station of claim 15 further comprising logic to select Multiple-Input Multiple-Output (MIMO) for a communication mode if said subscriber station is determined to be dynamic.

19. The base station of claim 14 wherein at least one of said one or more processors determines whether said subscriber station is closer to a cell boundary or closer to said base station.

20. The base station of claim 19 further comprising logic to select Maximum Ratio Combining (MRC) for a communication mode if said subscriber station is determined to be closer to said cell boundary.

21. The base station of claim 19 further comprising logic to select Beam Forming (BF) for a communication mode if said subscriber station is determined to be closer to said cell boundary.

22. The base station of claim 14, wherein at least one of said one or more processors determines whether said subscriber station is a member of a pair of orthogonal subscriber stations.

23. The base station of claim 22 further comprising logic to select Maximum Ratio Combining (MRC) for a communication mode if said subscriber station is determined not to be a member of a pair of orthogonal subscriber stations.

24. The base station of claim 22 further comprising logic to select Space Division Multiple Access (SDMA) for a communication mode if said subscriber station is determined to be a member of a pair of orthogonal subscriber stations.

25. The base station of claim 14 wherein at least one of said one or more processors determines whether more than one antenna is associated with said subscriber station.

26. The base station of claim 14 further comprising logic for selecting MIMO for a communication mode if a line-of-sight (LOS) condition is determined not to be associated with said subscriber station.

27. The base station of claim 14 further comprising logic for selecting Space Division Multiple Access (SDMA) for a communication mode if a line-of-sight (LOS) condition is determined to be associated with said subscriber station.

28. The base station of claim 14 further comprising logic to evaluate whether any of said determining the mobility of said subscriber station, said determining the position of said subscriber station, or said determining said orthogonality of the signal of said subscriber station should be repeated; and
logic to change said communication mode based, at least in part, upon changes made apparent by said repeated determinations.

29. A system including a subscriber station, said system comprising:
one or more processors determining the mobility of said subscriber station, determining the position of said subscriber station, and determining either spatial orthogonality of the signal of said subscriber station with respect to at least another subscriber station signal or whether a line-of-sight (LOS) condition is associated with said subscriber station and selecting a multiple antenna communication is further based upon one of said determination of said spatial orthogonality of the signal and said determination of said LOS condition.

30. The system of claim 29 wherein at least one of said one or more processors determines whether said subscriber station is static or dynamic.

31. The system of claim 30 further comprising logic to select Maximum Ratio Combining (MRC) for a communication mode if said subscriber station is determined to be dynamic.

32. The system of claim 30 further comprising logic to select Space Time Block Code (STBC) for a communication mode if said subscriber station is determined to be dynamic.

33. The system of claim 30 further comprising logic to select Multiple-Input Multiple-Output (MIMO) for a communication mode if said subscriber station is determined to be dynamic.

34. The system of claim 29 wherein at least one of said one or more processors determines whether said subscriber station is closer to a cell boundary or closer to said subscriber station.

35. The system of claim 34 further comprising logic to select Maximum Ratio Combining (MRC) for a communication mode if said subscriber station is determined to be closer to said cell boundary.

36. The system of claim 34 further comprising logic to select Beam Forming (BF) for a communication mode if said subscriber station is determined to be closer to said cell boundary.

37. The system of claim 29, wherein at least one of said one or more processors determines whether said subscriber station is a member of a pair of orthogonal subscriber stations.

38. The system of claim 37 further comprising logic to select Maximum Ratio Combining (MRC) for a communication mode if said subscriber station is determined not to be a member of a pair of orthogonal subscriber stations.

39. The system of claim 29 wherein at least one of said one or more processors determines whether more than one antenna is associated with said subscriber station.

40. The system of claim 29 further comprising logic for selecting MIMO for a communication mode if a line-of-sight (LOS) condition is determined not to be associated with said subscriber station.

41. The system of claim 29 further comprising logic for selecting Space Division Multiple Access (SDMA) for a communication mode if a line-of-sight (LOS) condition is determined to be associated with said subscriber station.

42. The system of claim 29 further comprising logic to evaluate whether any of said determining the mobility of said subscriber station, said determining the position of said subscriber station, or said determining said orthogonality of the signal of said subscriber station should be repeated; and
logic to change said communication mode based, at least in part, upon changes made apparent by said repeated determinations.

43. A method for wireless communication, said method comprising:
    determining, by a base station, whether more than one antenna is associated with a subscriber station;
    determining, by said base station, the mobility of said subscriber station;
    determining, by said base station, the position of said subscriber station;
    determining, by said base station, either spatial orthogonality of the signal of said subscriber station or whether there is a line-of-sight (LOS) condition associated with said subscriber station; and
    selecting, by said base station, a mode of communication based upon said determination of mobility, said determination of position, and said determination of said spatial orthogonality when more than one antenna is not associated with said subscriber station or said determination LOS condition when more than one antenna is associated with said subscriber station.

44. The method of claim 43 further comprising selecting Space Division Multiple Access (SDMA) for a communication mode if a line-of-sight (LOS) condition is determined to be associated with said subscriber station.

45. The method of claim 43 further comprising selecting MIMO for a communication mode if a line-of-sight (LOS) condition is determined not to be associated with said subscriber station.

46. A method for wireless communication, said method comprising:
    determining, by a subscriber station, the mobility of said subscriber station;
    determining, by said subscriber station, the position of said subscriber station; and
    determining, by said subscriber station, orthogonality of the signal of said subscriber station with respect to at least another subscriber station signal;
    selecting, by said subscriber station, a mode of communication based upon said determined mobility, position, and orthogonality; and
    selecting Maximum Ratio Combining (MRC) for a communication mode if said subscriber station is determined to be dynamic.

47. The method of claim 46 further comprising selecting Maximum Ratio Combining (MRC) for a communication mode if said subscriber station is determined to be closer to said cell boundary.

48. The method of claim 46 further comprising selecting Beam Forming (BF) for a communication mode if said subscriber station is determined to be closer to said cell boundary.

49. The method of claim 46 further comprising selecting Maximum Ratio Combining (MRC) for a communication mode if said subscriber station is determined not to be a member of a pair of orthogonal subscriber stations.

50. The method of claim 46 further comprising evaluating whether any of said determining the mobility of said subscriber station, determining the position of said subscriber station, or determining orthogonality of the signal of said subscriber station should be repeated; and
    changing said communication mode based, at least in part, upon changes made apparent by said repeated determinations.

* * * * *

UNITED STATES PATENT AND TRADEMARK OFFICE
CERTIFICATE OF CORRECTION

PATENT NO.        : 8,228,809 B1
APPLICATION NO.   : 11/963265
DATED             : July 24, 2012
INVENTOR(S)       : Guanbin Xing et al.

Page 1 of 1

It is certified that error appears in the above-identified patent and that said Letters Patent is hereby corrected as shown below:

<u>Title Page 2, item (56), Other Publications:</u>
Column 1, line 34: change "Bearnforming" to --Beamforming--;
Column 2, line 5: change "Modern" to --Modem--;
Column 2, line 22: change "Elecrtronics" to --Electronics--; and
Column 2, line 28: change "45." to --45,--.

Signed and Sealed this
Thirtieth Day of April, 2013

Teresa Stanek Rea
*Acting Director of the United States Patent and Trademark Office*